United States Patent
Sonoda et al.

(10) Patent No.: US 9,857,617 B2
(45) Date of Patent: Jan. 2, 2018

(54) LIQUID CRYSTAL DISPLAY DEVICE

(71) Applicant: Japan Display Inc., Tokyo (JP)

(72) Inventors: Daisuke Sonoda, Tokyo (JP); Tatsuya Ide, Tokyo (JP); Toshimasa Ishigaki, Tokyo (JP); Masanobu Ikeda, Tokyo (JP); Koji Ishizaki, Tokyo (JP); Hayato Kurasawa, Tokyo (JP); Yoshihiro Watanabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 343 days.

(21) Appl. No.: 14/833,752

(22) Filed: Aug. 24, 2015

(65) Prior Publication Data
US 2016/0054608 A1 Feb. 25, 2016

(30) Foreign Application Priority Data
Aug. 25, 2014 (JP) .................................. 2014-170506

(51) Int. Cl.
*G02F 1/1335* (2006.01)
*G02F 1/1333* (2006.01)
*G02F 1/13* (2006.01)

(52) U.S. Cl.
CPC .... *G02F 1/13338* (2013.01); *G02F 1/133528* (2013.01); *G02F 2202/28* (2013.01)

(58) Field of Classification Search
CPC .................................................. G02F 1/13338
See application file for complete search history.

(56) References Cited

U.S. PATENT DOCUMENTS

| 6,038,008 | A | * | 3/2000 | Kim | ................... G02F 1/136227 |
|---|---|---|---|---|---|
|  |  |  |  |  | 349/138 |
| 2009/0185088 | A1 | * | 7/2009 | Shinohara | ............. G06F 3/0412 |
|  |  |  |  |  | 349/12 |
| 2012/0081330 | A1 | * | 4/2012 | Park | ...................... G06F 3/0412 |
|  |  |  |  |  | 345/174 |
| 2012/0241408 | A1 |  | 9/2012 | Misaki |  |

FOREIGN PATENT DOCUMENTS

| JP | 5323945 B2 | 10/2013 |
|---|---|---|
| WO | 2011/065292 A1 | 6/2011 |

* cited by examiner

*Primary Examiner* — Wen-Ying P Chen
(74) *Attorney, Agent, or Firm* — Typha IP LLC (57) ABSTRACT

A first electrode 30 for the touch panel is formed on an outer side of a counter substrate 200, and the protection film 210 is formed over the first electrode 30 to cover it. A defect 211 in the protection film 210 is filled in with another protection film 210 by inkjet coating. The surface of the protection film 210 is rubbed to a rough surface finish. The polarization plate 220 is attached to the rough surface of the protection film 210 via an adhesive material 221. Since the defective region is repaired by the formation of the protection film 210, corrosion of the first electrode (wiring) 30 due to the presence of the adhesive material 221 can be prevented, and since the surface of the second protection film 210 is made rough, a resulting increase in adhering surface area enhances the adhesion for attaching the polarization plate 220.

10 Claims, 10 Drawing Sheets

# LIQUID CRYSTAL DISPLAY DEVICE

CLAIM OF PRIORITY

The present application claims priority from Japanese Patent Application JP 2014-170506 filed on Aug. 25, 2014, the content of which is hereby incorporated by reference into this application.

BACKGROUND OF THE INVENTION

1. Field of the Invention

The present invention relates generally to display devices, and more particularly to liquid crystal display devices with a touch panel function incorporated in a liquid crystal display panel.

2. Description of the Related Art

In liquid crystal display devices, a thin-film transistor (TFT) substrate, on which a pixel electrode, thin-film transistors (TFTs), and other elements are formed in a matrix format, and a counter substrate are arranged with liquid crystals sandwiched between the TFT substrate and the counter substrate. A transmittance of the light, as passed through the liquid crystal molecules, is controlled on a pixel-by-pixel basis to form an image. Since liquid crystal display devices are flat and lightweight, they are expanding their applications in various fields.

Liquid crystal display devices that employ a new touch panel scheme as an input method, are increasing in recent years. Traditionally, a type in which a liquid crystal display panel and a touch panel are fabricated separately and the touch panel is mounted on the counter substrate of the liquid crystal display panel, has been used as a conventional touch panel scheme. JP-2011-543223-A describes a configuration employing a transparent organic resin to protect metallic wiring for a touch panel.

SUMMARY OF THE INVENTION

It is further requested that a liquid crystal display device be made thin in its entirety as far as possible. A scheme in which the liquid crystal display panel itself is endowed with a function of a touch panel is developed with a view to meeting such a demand. In this scheme, one of two electrodes for the touch panel is formed outside a counter substrate of the liquid crystal display panel and the other electrode is formed inside the liquid crystal display panel.

In this case, the one of the two electrodes needs protection since it is formed outside the counter substrate of the liquid crystal display panel. An organic film of acryl or the like is used as a protection film, and the organic film is usually formed by inkjet coating. The film formation by inkjet coating often causes film defects due to imperfections such as an inappropriate surface state of the substrate and/or improper ink discharge from a nozzle.

A polarization plate is attached on the protection film for the electrode, and an adhesive material for attaching the polarization plate contains acid components. This implies that damage due to the acid could result in electrical disconnection of the electrode at a defective region of the protection film. This risk increases particularly where the electrode is formed from a metal or an alloy.

Another problem exists: the adhesive material, used to attach the polarization plate on the protection film, is usually weak in adhesion, compared with a case in which the adhesive material is used to attach the polarization plate directly to a glass substrate.

An object of the present invention is to provide a liquid crystal display device having a touch panel function, adapted for preventing electrical disconnection of a touch panel electrode formed outside a counter substrate, and for ensuring necessary adhesion for attaching a polarization plate on a protection film.

The present invention is contemplated to overcome the foregoing problems. More specifically, this is accomplished primarily by the following means.

(1) A liquid crystal display device including a liquid crystal display panel having liquid crystals sandwiched between a first substrate and a second substrate, wherein: a first electrode is formed on an outer side of the first substrate to extend in a first direction, and a second electrode is formed on an inner side of the first substrate or second substrate to extend in a direction perpendicular to the first direction, where the inner side of the first substrate or second substrate represents a side of the first substrate or second substrate that faces the liquid crystals, and the outer side of the first substrate or second substrate represents a side opposite to the side of the first substrate or second substrate that faces the liquid crystals, the liquid crystal display panel thereby being endowed with a touch panel function; a protection film is formed over the first electrode; a polarization plate is disposed on the protection film via an adhesive material; and a rubbed surface exists as an interface of the protection film with respect to the adhesive material.

(2) The liquid crystal display device described in above item (1), wherein the interface of the protection film with respect to the adhesive material ranges between 0.05 and 0.50 μm in surface roughness Rz.

(3) The liquid crystal display device described in item (1), wherein the interface of the protection film with respect to the adhesive material ranges between 0.05 and 0.20 μm in surface roughness Rz.

(4) A manufacturing method for a liquid crystal display device with a liquid crystal display panel which includes liquid crystals sandwiched between a first substrate and a second substrate and which also functions as a touch panel, the manufacturing method including the steps of: forming a first electrode on an outer side of the first substrate so that the first electrode extends in a first direction, where the outer side of the first substrate represents a side opposite to the side of the first substrate that faces the liquid crystals; forming a protection film over the first electrode by means of inkjet coating; inspecting a defect in the protection film and then correcting the defect by inkjet coating; curing the protection film; after the curing of the protection film, rubbing a surface of the protection film to a rough surface finish; and attaching a polarization plate to the surface of the protection film via an adhesive material.

(5) A manufacturing method for a liquid crystal display device with a liquid crystal display panel which includes liquid crystals sandwiched between a first substrate and a second substrate and which also functions as a touch panel, the manufacturing method including the steps of: forming a first electrode on an outer side of the first substrate so that the first electrode extends in a first direction, where the outer side of the first substrate represents a side opposite to the side of the first substrate that faces the liquid crystals; forming a first protection film over the first electrode by means of inkjet coating; forming a second protection film over the first electrode by means of inkjet coating; curing the first protection film and the second protection film; after the curing of the first protection film and the second protection film, rubbing a surface of the second protection film to a rough surface finish; and attaching a polarization plate to the surface of the second protection film via an adhesive material.

(6) The manufacturing method for a liquid crystal display device, described in above item (4) or (5), wherein the rough surface formed on the surface of the protection film or second protection film ranges between 0.05 and 0.50 µm in surface roughness Rz.

(7) The manufacturing method for a liquid crystal display device, described in item (4) or (5), wherein the rough surface formed on the surface of the protection film or second protection film ranges between 0.05 and 0.20 µm in surface roughness Rz.

A liquid crystal display device according to an aspect of the present invention includes a liquid crystal display panel endowed with a function of a touch panel and having a first electrode for the touch panel, formed externally to a counter substrate, and a second electrode formed internally to the liquid crystal display panel. This liquid crystal display device provides sufficient protection for the first electrode and enhanced adhesion for attaching a polarization plate on a protection film for the first electrode. Accordingly, the liquid crystal display device with a highly reliable touch panel function is obtained.

DESCRIPTION OF THE PREFERRED EMBODIMENTS

The present invention will be described in detail below with reference to embodiments thereof.

First Embodiment

Figure 1:
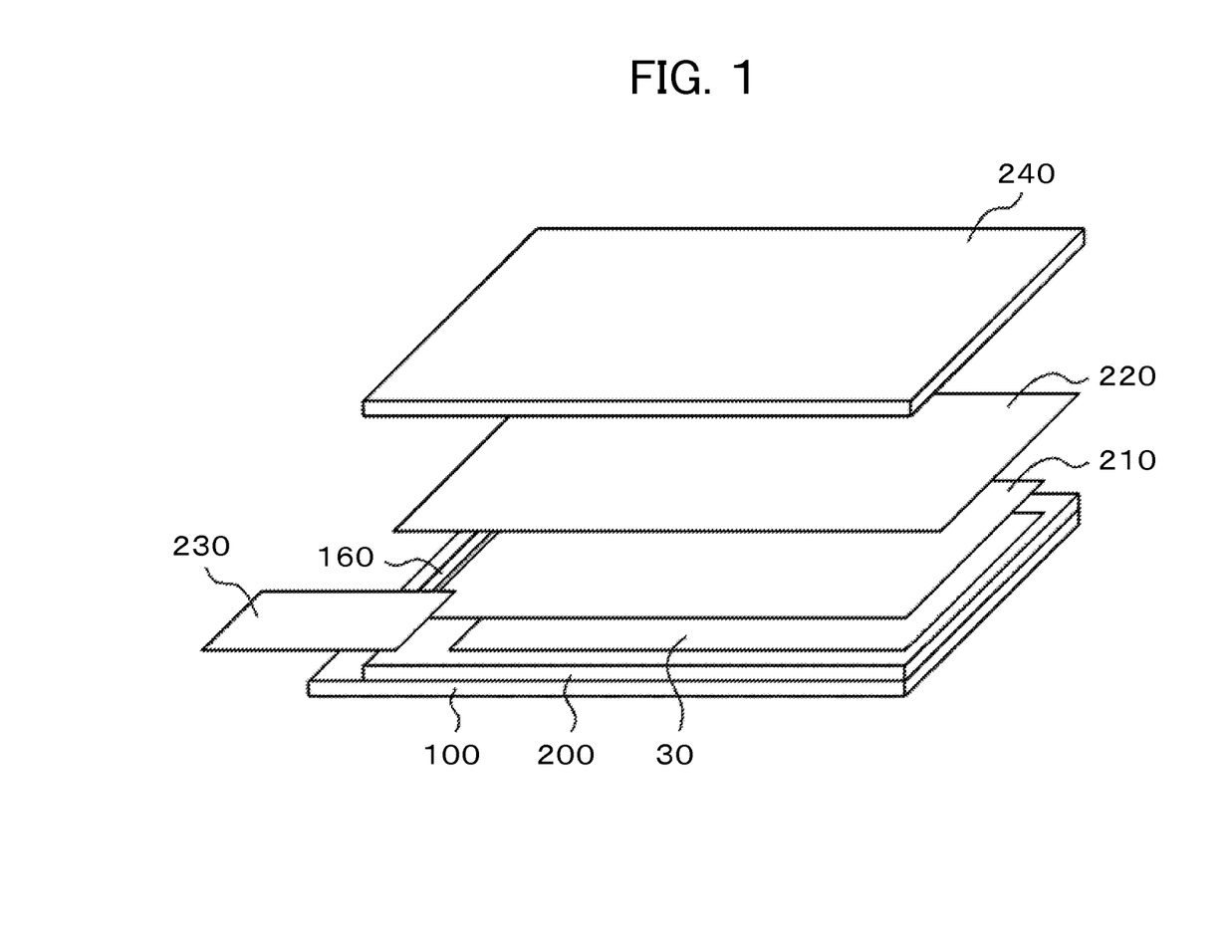
FIG. 1 is an exploded perspective view of a liquid crystal display device according to a first embodiment of the present invention.

FIG. 1 is an exploded perspective view of a liquid crystal display device according to a first embodiment of the present invention. A liquid crystal display panel for display, shown in FIG. 1, is endowed with a function of a touch panel. Referring to FIG. 1, a counter substrate 200 is disposed on a TFT substrate 100, and a first electrode (called an Rx electrode) for the touch panel is formed on an outer side of the counter substrate 200. A protection film 210 made from a transparent organic material such as acryl is formed over the first electrode 30. Furthermore, an upper polarization plate 220 is disposed over the protection film 210. The upper polarization plate 220 is attached to the protection film via an adhesive material. Moreover, cover glass 240 is disposed over the upper polarization plate 220. Although not shown in FIG. 1, a lower polarization plate is placed on a lower side of the TFT substrate 100.

In FIG. 1, a flexible wiring substrate 230 for the touch panel is mounted near a lateral edge of the counter substrate 200 so that the counter substrate can exchange signals with and receive/deliver electric power from/to the first electrode 30 formed on the outer side of the counter substrate 200. A common electrode formed on the TFT substrate 100 of the liquid crystal display panel is endowed with a function of a second electrode (called a Tx electrode), thereby assigning the function of the touch panel to the liquid crystal display panel of FIG. 1.

Figure 2:
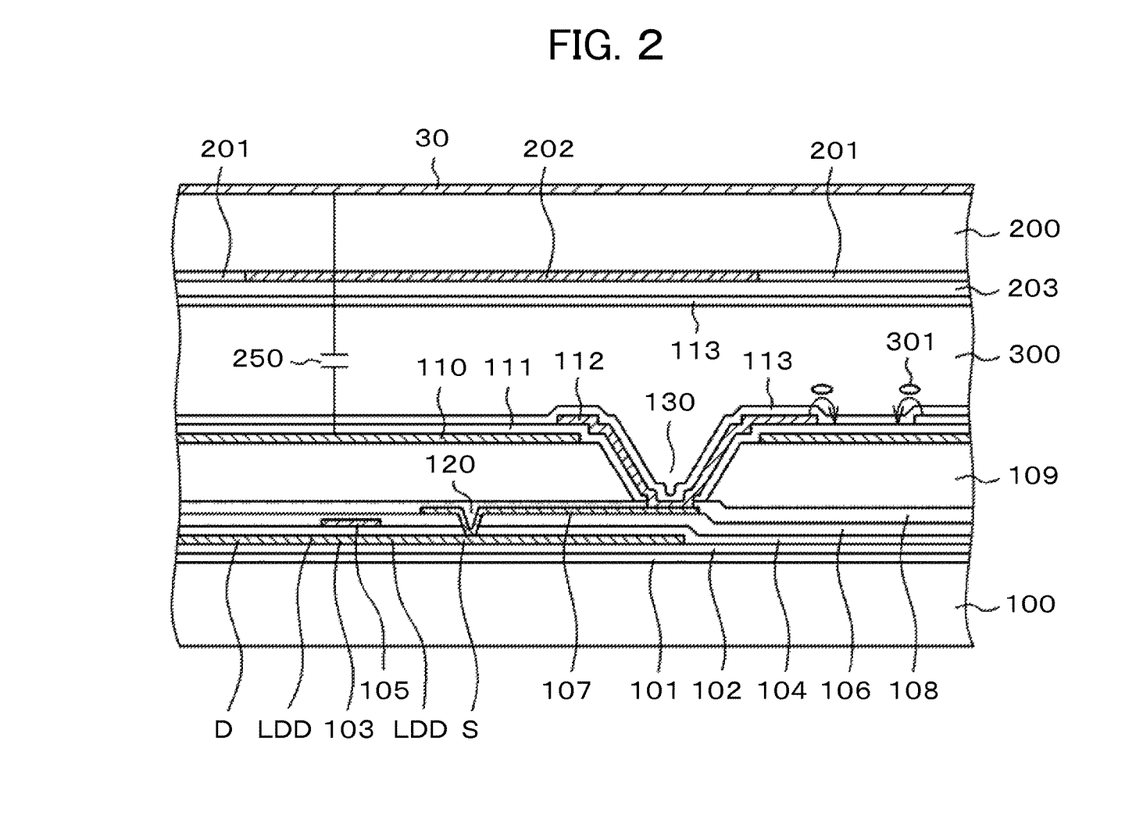
FIG. 2 is a sectional view of a liquid crystal display panel of an IPS scheme.

FIG. 2 is a sectional view of the liquid crystal display panel shown in FIG. 1. While the following description takes a liquid crystal display device of the In-Plane Switching (IPS) scheme as an example, the present invention is not limited to the IPS scheme and can also be applied to liquid crystal display devices of other schemes including the Vertical Alignment (VA) scheme and the Twisted Nematic (TN) scheme.

As shown in FIG. 2, a first underlying film 101 made of SiO, and a second underlying film 102 made of SiN are formed on the glass substrate 100 by chemical vapor deposition (CVD). The first underlying film 101 and the second underlying film 102 both have a function that prevents contamination of a semiconductor layer 103 due to impurities that might be diffused from the glass substrate 100.

The semiconductor layer 103 is formed on the second underlying film 102. The semiconductor layer 103 was originally an amorphous silicon (a-Si) film formed on the second underlying film 102 by CVD, and this a-Si film was later transformed into a poly-Si film by laser annealing. The poly-Si film is patterned by photolithography.

A gate-insulating film 104 is formed on the semiconductor layer 103. The gate-insulating film 104, a SiN film made from tetraethoxysilane (TEOS), is also formed by CVD. A gate electrode 105 is formed on the gate-insulating film 104. A gate line 10 shown in FIG. 3 doubles as the gate electrode 105. The gate electrode 105 is formed from a MoW film, for example. An Al alloy is used when the gate electrode 105 or the gate line 10 needs reduction in resistance.

The gate electrode 105 is patterned by photolithography, during the patterning of which a poly-Si layer is doped with phosphorus, boron, or other impurities, by ion implantation to form a source S or a drain D on the poly-Si layer. In addition, a lightly doped drain (LDD) layer is formed between a channel layer and source S or drain D of the poly-Si layer via a photoresist used during the patterning of the gate electrode 105.

After the formation of the LDD layer, a first interlayer insulating film 106 of SiO is formed over the gate electrode 105. The first interlayer insulating film 106 insulates the gate electrode (gate wiring) 105 and a contact electrode 107. A through-hole 120 communicating with both the first interlayer insulating film 106 and the gate-insulating film 104 is formed to connect the source S of the semiconductor layer 103 to the contact electrode 107. At the same time, photolithography for the formation of the through-hole 120 communicating with both the first interlayer insulating film 106 and the gate-insulating film 104 is performed.

The contact electrode 107 is formed on the first interlayer insulating film 106. The contact electrode 107 connects to a pixel electrode 112 via a through-hole 130. The drain D of the TFT layer connects to a data line 20, at a section not shown, via the through-hole 120 shown in FIG. 3.

The contact electrode 107 and the data line 20 are formed at the same time on the same layer. The contact electrode 107 and the data line (hereinafter, both will be collectively described as the contact electrode 107) use an AlSi alloy, for example, to reduce resistance. The AlSi alloy is liable to cause hillocks or to diffuse the aluminum Al to other layers. The AlSi, therefore, has a structure in which it is sandwiched between, for example, a barrier layer of MoW and a gap layer, both of these layers being omitted from FIG. 2.

An inorganic passivation film (insulating film) 108 is formed over the contact electrode 107, thereby protecting the entire TFT layer. The inorganic passivation film 108, as with the first underlying film 101, is formed by CVD. An organic passivation film 109 is formed over the inorganic passivation film 108. While a photosensitive acrylic resin is used to form the organic passivation film 109, a silicone resin, an epoxy resin, a polyimide resin, or the like can be used besides an acrylic resin to form the organic passivation film 109. The organic passivation film 109 is formed to be thick enough to function as a planarizing film. The thickness of the organic passivation film 109 ranges between 1 and 4 μm, but is usually up to nearly 2 μm.

A through-hole 130 communicating with both the inorganic passivation film 108 and the organic passivation film 109 is formed to establish electrical conduction between the pixel electrode 112 and the contact electrode 107. The organic passivation film 109 uses a photosensitive resin. After coating with the photosensitive resin, exposure of this resin to light dissolves only the light-irradiated region into a specific developing agent. In other words, the use of the photosensitive resin allows formation of a photoresist to be omitted. After the through-hole 130 communicating with the organic passivation film 109 has been formed, baking this passivation film at nearly 230° C. completes the passivation film 109.

Figure 3:
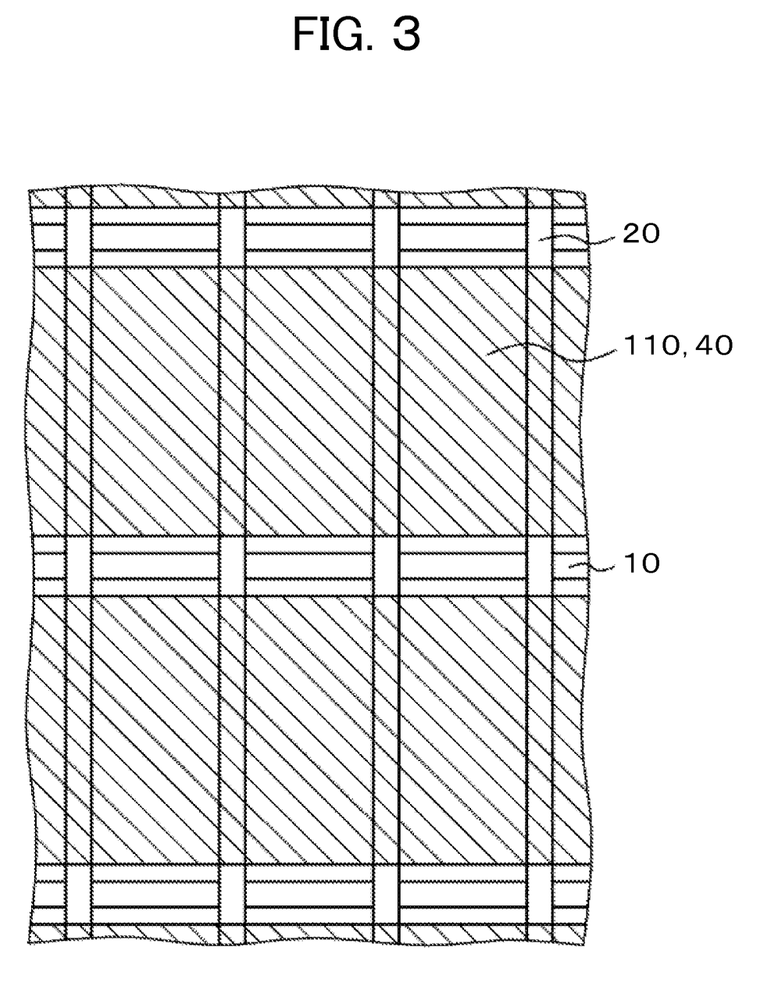
FIG. 3 is a plan view of a common electrode that shows a shape of the common electrode doubling as a second electrode of a touch panel, above a TFT substrate.

After the formation of the organic passivation film 109, indium tin oxide (ITO) to serve as the common electrode 110 is formed by sputtering. The ITO is next patterned to remove it from the through-hole 130 and peripheral regions of this through-hole, and besides, from a region above the gate line. The ITO is removed from above the gate line because the common electrode needs to function as the second electrode of the touch panel. As shown in FIG. 3, the common electrode 110 is formed in parallel to the gate line so as to operate in common for pixels present in a direction that the gate line extends.

After the formation of the common electrode 110, SiN to serve as a second interlayer insulating film 111 is formed above the common electrode 110 and the organic passivation film 109 by CVD. After the formation of the second interlayer insulating film 111, a through-hole for establishing electrical conduction between the contact electrode 107 and the pixel electrode 112, at the through-hole 130, is formed to communicate with the second interlayer insulating film 111 and the inorganic passivation film 108.

After the formation of the through-hole, the ITO is formed by sputtering and then patterned to form the pixel electrode 112. The pixel electrode 112 is next coated with an alignment layer-forming material by flexographic printing, inkjet coating, or the like, and then baked to form an alignment layer 113. An orientation process for the alignment layer 113 uses photo-alignment based on polarized ultraviolet radiation, besides a rubbing method.

Application of a voltage between the pixel electrode 112 and the common electrode 107 generates such electric lines of force as shown in FIG. 2. Resulting electric fields rotate liquid crystal molecules 301. The amount of light passing through a liquid crystal layer 300 will then be controlled for each pixel, and an image will be formed.

As shown in FIG. 2, the counter substrate 200 is disposed at an opposite side across the liquid crystal layer 300. Color filters 201 are formed on an inner side of the counter substrate 200. Pixel-specific color filters of red, green, and blue are formed as the color filters 201, thus forming a color image. Between every two of the color filters 201 is formed a black matrix 202 to improve image contrast. The black matrix also functions as a light-shielding film for the TFT substrate and prevents a photo-electric current from flowing into the TFT substrate.

An overcoat layer 203 is formed to cover the color filters 201 and the black matrix 202. The overcoat layer 203 planarizes and smoothens originally rough surfaces of the color filters 201 and the black matrix 202. Another alignment film 113 for determining initial orientations of the liquid crystals is formed on the overcoat layer 203. An orientation process for this alignment layer uses a rubbing method or a photo-alignment method, as with the orientation process for the alignment layer 113 formed above the TFT substrate 100.

The first electrode 30 for causing the liquid crystal display panel to function as the touch panel is formed on the outer side of the counter substrate 200. As shown in FIG. 2, a capacitance 250 is formed between the first electrode 30 on the outer side of the counter substrate 200 and the second electrode 40 whose function is assigned to the common electrode 110 formed on the TFT substrate 100. Detection of an operator-touched position on the touch panel is accomplished by detection of a change in a capacity of the capacitance 250.

FIG. 3 is a plan view of the TFT substrate 100. As shown in FIG. 3, gate lines 10 extending in a horizontal direction are arranged in a vertical direction. In addition, data lines 20 extending in the vertical direction are arranged in the horizontal direction. Regions bounded by the gate lines 10 and the data lines, 20, represent pixels. The pixel electrode, TFT, and other elements lying within the pixel region are omitted in FIG. 3. Referring to FIG. 3, the common electrode 110 is placed in striped form horizontally in common with the pixels formed between the gate lines 10. The common electrode 110 of the striped form is used as the second electrode 40 of the touch panel.

Figure 4:
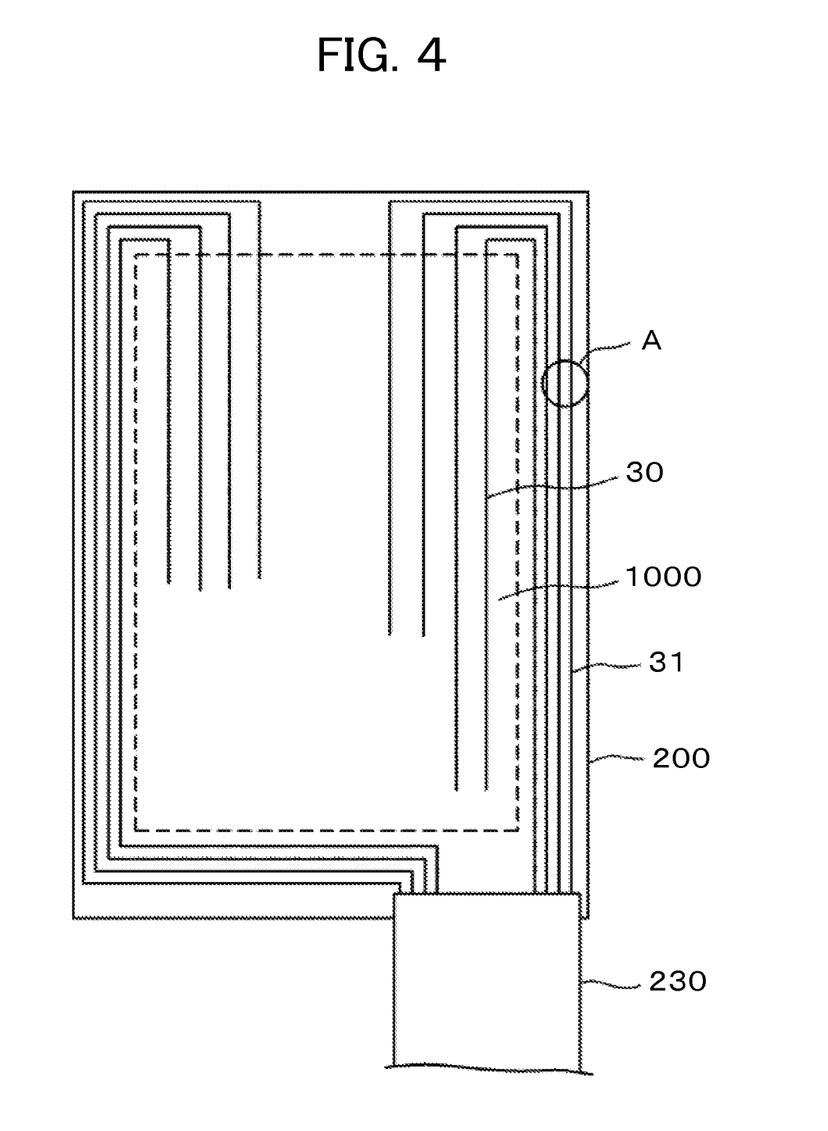
FIG. 4 is a plan view of a counter substrate formed with first wiring for the touch panel.

The first electrode 30 of the touch panel is formed on the outer side of the counter substrate 200. FIG. 4 is a plan view of the counter substrate 200 for the liquid crystal display panel, formed with the first electrode 30 on the counter substrate. The first electrode 30 in FIG. 1 extends in a direction parallel to a long side of the TFT substrate 100. The second electrode 40 for the touch panel, formed on the TFT substrate 100 so that the common electrode 110 functions as the second electrode 40, extends in a direction perpendicular to the first electrode 30.

Referring to FIG. 4, lead wires 31 from the electrode 30 extend externally along a display region 1000 and connect to the flexible wiring substrate 230 for the touch panel. A protection film made of an organic material such as acryl is formed over the first electrode 30 and the lead wires 31. A variety of methods can be used to form the protection film, and inkjet coating, in particular, can be applied to products of various specifications. Inkjet coating, however, is prone to cause defects in the formation of films due to possible improper ink discharge from a nozzle, nonuniformity of a surface state, or other imperfections.

Figure 5A:
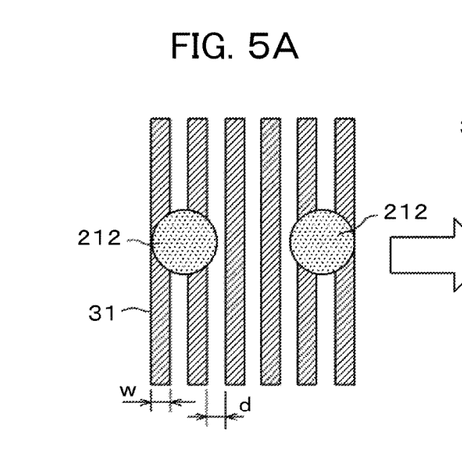
FIGS. 5A to 5D are schematic diagrams that show occurrence of a defect of a protection film in a region where lead wires are formed around a counter substrate.

As shown in FIG. 4, the outside of the display region 1000 is dense with the lead wires 31 extending from the electrode 30. Coating defects, in particular, tend to occur in such a region. FIGS. 5A to 5D show examples of coating defects. FIGS. 5A to 5D are enlarged views of region A in FIG. 4. Referring to FIG. 5A, lead wires 31 extend in a vertical direction. Width 'w' of the lead wires 31 is 5 μm, for example, and a wire-to-wire distance 'd' is also 5 μm, for example.

Figure 5B:
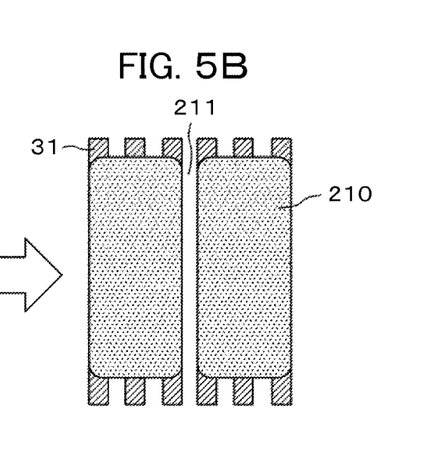

FIG. 5A is a plan view of a protection film with droplets 212 that were formed by jets of the ink from an inkjet printer or coater, and FIG. 5B is a sectional view of the droplets 212. The droplets 212 from the inkjet printer or coater are formed at predetermined pitches, say, 84.5 μm. Viscosity of the material ranges, for example, between 4 and 20 cp. The thus-formed droplets normally spread in all directions to become a uniform membrane. However, in the case where the wires 31 extend in one direction as shown in FIG. 5, since the droplets 212 easily spread in the direction that the wires 31 extend, a defect 211, a blank space in the protection film spanning the wires 31, is likely to easily occur.

Figure 5C:
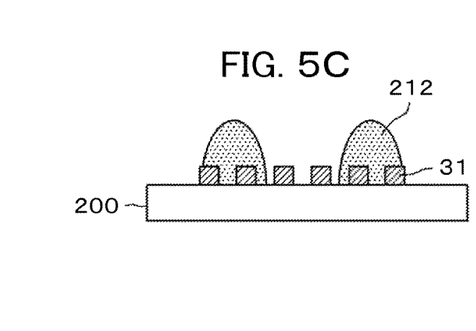
Figure 5D:
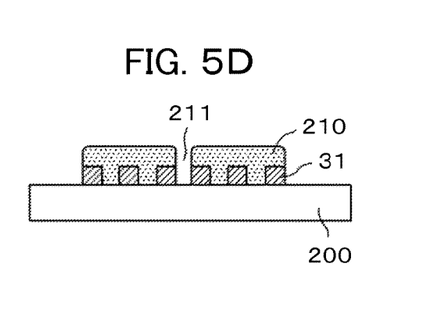

FIGS. 5C and 5D show the examples where, as described above, the spread of the droplets 212 in the direction that the wires 31 extend is likely to result in the occurrence of the defect 211, that is, failure to form a film in a direction perpendicular to that in which the wires extend. FIG. 5C is a plan view showing this state, and FIG. 5D is a sectional view thereof.

Figure 6:
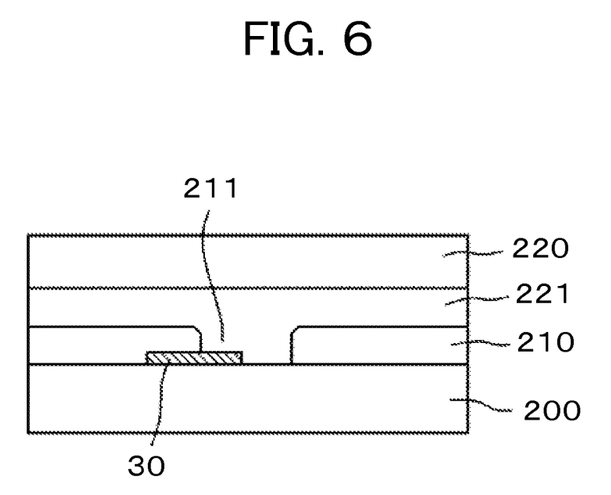
FIG. 6 is a sectional view of a defect of a protection film.

The protection film 210 that has been coated with the inkjets is cured by ultraviolet radiation and/or heat. After this curing process, the polarization plate 220 is attached on the protection film 210 via an adhesive material 221. FIG. 6 is an enlarged sectional view of a defect in the region including the attached polarization plate 220. The defect, or the blank space in the protection film 210 shown in FIG. 6, is filled in with the adhesive material 221. The adhesive material 221, however, contains acid components, which might corrode the first wiring 30 not protected by the protection film 210. The corrosion of the first wiring 30 becomes problematic, particularly when or if the first wiring 30 is formed from a metal or an alloy.

Figure 7:
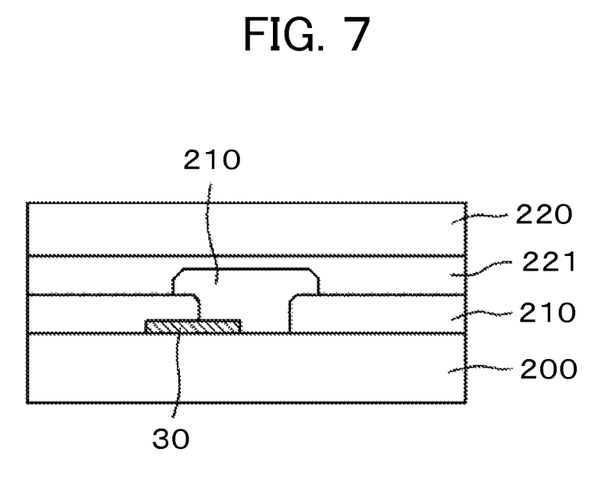
FIG. 7 is a sectional view of a repaired defective region on a protection film.

FIG. 7 is a sectional view of a repaired defective region on a protection film. That is, FIG. 7 shows an example in which the protection film 210, after being coated with the inkjets, underwent defect inspection and then the defective region 211 was repaired. This repair is performed by, after the protection film 210 has been coated, first inspecting the surface of the protection film 210 and then applying droplets of the inkjet to the region where the defect 211 is occurring. The attaching of the polarization plate 220 follows the repair.

With the configuration as shown in FIG. 7, the corrosion of the first wiring 30 due to the presence of the adhesive material 221 can be prevented. The configuration in FIG. 7, however, is useless for achieving a second effect of the present invention, that is, the enhancement of the adhesion for attaching the polarization plate 220 to the protection film 210.

Figure 8A:
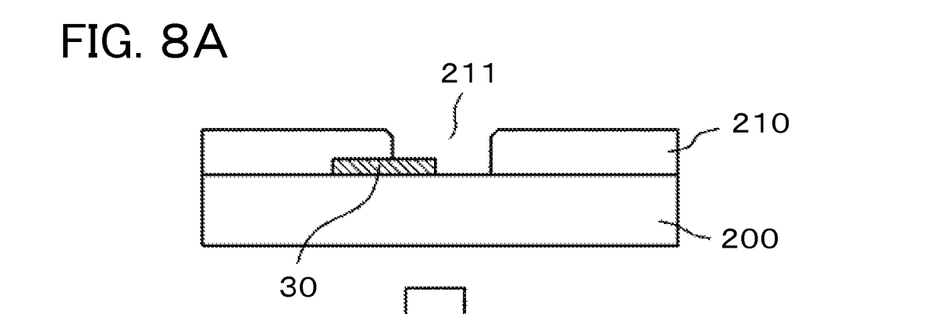
FIGS. 8A to 8D are sectional views illustrating the first embodiment of the present invention.
Figure 8B:
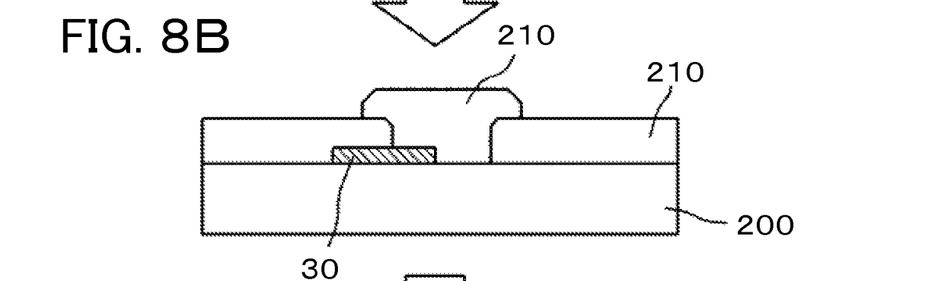

FIGS. 8A to 8D are sectional views illustrating the configuration of the present invention. As shown in FIG. 8A, the protection film 210 is formed on the counter substrate 200 by inkjet coating, in which case the first electrode 30 has already been formed on the counter substrate 200. The protection film 210 has a thickness of 2 μm, for example. A film defect 211 exists in the protection film region 210. FIG. 8B shows a repaired state of the film defective region 211 which was repaired by applying a dropwise coat of an ink jet thereto. As shown in FIG. 8B, the repaired region is thicker than other regions.

Figure 8C:
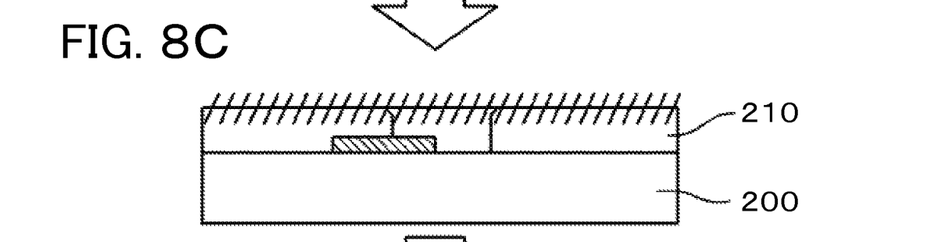

FIG. 8C shows a rubbed surface state of the protection film 210. The surface of the protection film in FIG. 8C is hatched, which indicates that the surface was rubbed to a rough surface. This rubbing operation can be performed using abrasive paper (or the like) that contains an abrasive material having a predetermined particle size. To what roughness level the surface of the protection film is to be rubbed can be controlled according to the particle size of the abrasive material used.

Figure 8D:
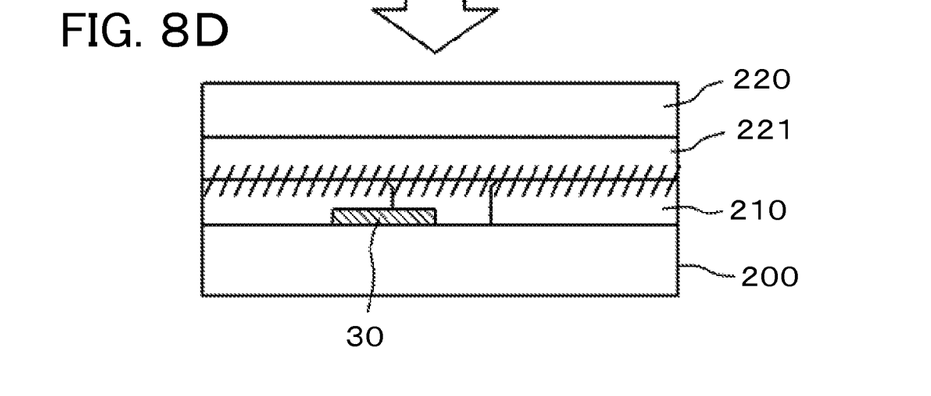

After being rubbed, the polarization plate 220 is attached via the adhesive material 221, as shown in FIG. 8D. Hatching in FIG. 8D indicates that the protection film 210 and the adhesive material 221 are surface-roughed at an interface present between both. As shown in FIG. 8D, the first wiring 30 is fully covered with the protection film 210, which means that the possible corrosion of the first wiring 30 due to the presence of the adhesive material 221 can be prevented from occurring.

Figure 9:
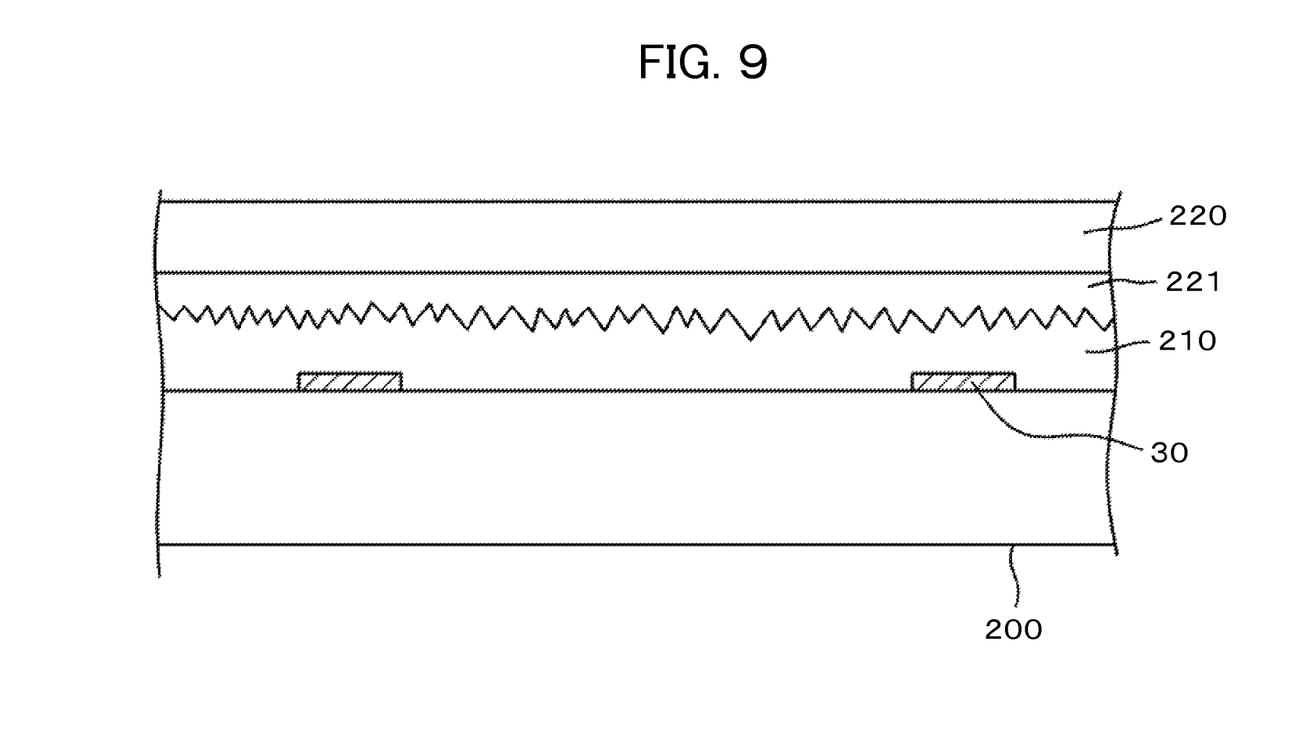
FIG. 9 is a sectional view of the present invention.

FIG. 9 is an enlarged sectional view showing a state in which the polarization plate 220 is attached to the surface of the protection film 210. As shown in FIG. 9, the first wiring 30 is formed on the counter substrate 200 and the protection film 210 is formed over the first wiring 30. The surface of the protection film 210 is made rough by rubbing. The polarization plate 220 is attached to this rough surface of the protection film 210 via the adhesive material 221. As shown in FIG. 9, the surface of the protection film 210 is made rough, which increases an adhering surface area of the adhesive material 221 and correspondingly enhances adhesion. This enables the present invention to enhance the adhesion for attaching the polarization plate 220 to the protection film 210.

When the surface of the protection film 210 is to be made rough, the roughness level of the surface is important, for excessive surface roughing of the protection film 210 will deteriorate image quality. Conversely, insufficient surface roughing will nullify the effect of the present invention to enhance adhesion. Surface roughness can be defined in terms of, for example, Rz based on a relevant code of Japanese Industrial Standards (JIS).

In consideration of image quality, the surface roughness of the protection film 210 is preferably up to 0.5 μm, and more preferably 0.2 μm, in Rz. For greater adhesion, however, the roughness of the surface needs to be at least 0.05 μm. The roughness of the surface can be measured with an atomic force microscope (AFM) or the like.

Figure 10:
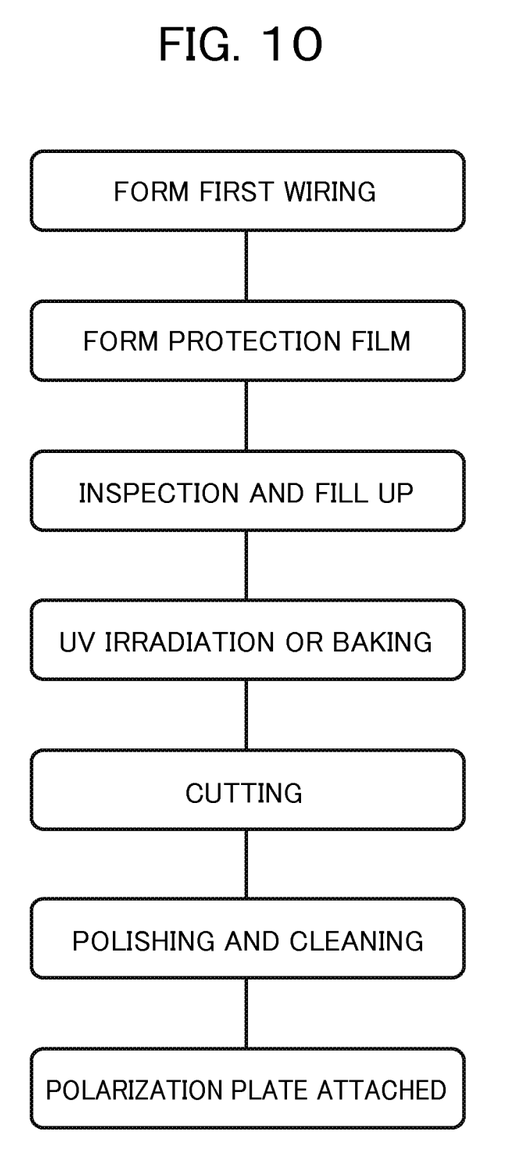
FIG. 10 is a flowchart that shows manufacturing steps relating to the first embodiment.

FIG. 10 is a flowchart of a process for achieving the configuration of the present invention that has been described above. As shown in FIG. 10, first wiring is formed on the outer side of the counter substrate. The wiring is formed from either ITO, a metal, or an alloy. After being formed, the first wring is covered with a protection film by inkjet coating, which is further followed by inspection of this protection film with an inspection head to examine for defects on the protection film. This inspection head includes a camera and a nozzle adapted to deliver droplets of a protection film forming liquid. If a defect is detected on the protection film, the inspection head delivers a droplet of the protection film forming liquid from the nozzle to the defective region, thereby repairing the defective region.

After the above inspection and repair, the protection film is cured by ultraviolet radiation and/or heat. Whether ultraviolet radiation or heat is to be used depends on the kind of material used to form the protection film. The protection film may be pre-cured with ultraviolet radiation and then completely cured with heat.

Liquid crystal display panels are fabricated efficiently. Instead of being fabricated one by one, they are fabricated in this manner: a large number of liquid crystal display panels are formed on a mother substrate and after completion of the mother substrate, the liquid crystal display panels are separated from the mother substrate. This process takes place under a predetermined state of the mother substrate. After the curing of the protection film on each of the liquid crystal display panels, these panels are separated from the mother substrate by means of scribing or the like.

After the separation from the mother substrate, the liquid crystal display panels are rubbed and cleaned. Each panel is rubbed using the abrasive paper (or the like) of a predetermined particle size. Conventional processes include the step of using a cloth or the like to remove contamination from the surfaces of liquid crystal display panels after these panels have been separated from a mother substrate. Accordingly, adding the rubbing step with abrasive paper, as in the present invention, does not mean significantly increasing the number of steps. The polarization plate is attached after the surface of the protection film has been made rough in the above manner.

As described above, in the present invention, the first wiring formed on the outer side of the counter substrate is fully protected and the adhesion of the adhesive material for attaching the polarization plate to the protection film is enhanced.

Second Embodiment

Figure 11A:
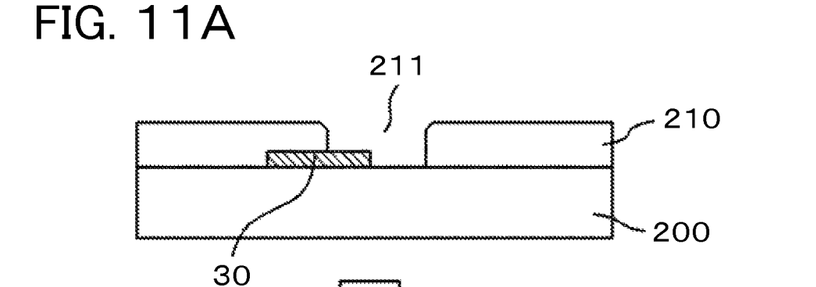
FIGS. 11A to 11D are sectional views illustrating a second embodiment of the present invention.

FIGS. 11A to 11D are sectional views illustrating a second embodiment of the present invention. As shown in FIG. 11A, the protection film 210 is formed on the counter substrate 200 by inkjet coating, in which case the first electrode 30 has already been formed on the counter substrate 200. The protection film 210 has a thickness of 2 μm, for example. A film defect 211 exists in the protection film region 210.

Figure 11B:
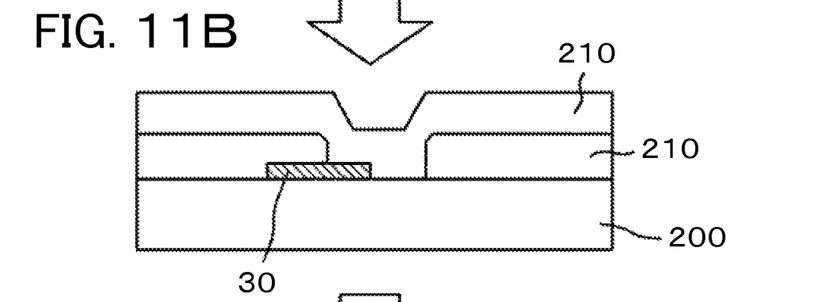

The present embodiment differs from the first embodiment in that the formation of the protection film 210 by inkjet coating is followed by second inkjet coating, not defect inspection, to form a second protection film 210 over the original protection film 210. This state is shown in FIG. 11B. Repeating the inkjet coating of the protection film 210 twice in this way renders it less likely for the same defect to occur at the same location. If the film defect 211 is likely to be due to the inkjet coating device itself, the position for the second delivery of the ink may be changed from that of the first delivery.

Figure 11C:
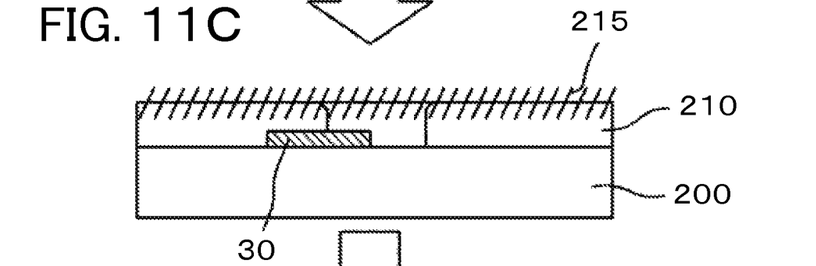
Figure 11D:
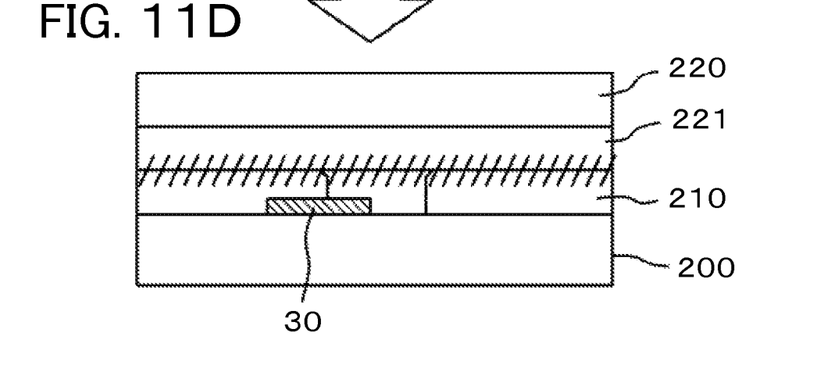

After the second inkjet coating, the protection film 210 is cured with ultraviolet radiation or heat. After this, as in the first embodiment, the surface of the protection film 210 is made rough using abrasive paper or the like, as shown in FIG. 11C, and then the polarization plate 220 is attached to the rough surface of the protection film 210, as shown in FIG. 11D.

In the present embodiment, surface inspection and repairs can be omitted by applying two coats of ink to the protection film 210. It is the same as in the first embodiment that the first electrode 30 is fully protected and that the adhesion for attaching the polarization plate 220 is enhanced.

It has been described above that the first electrode extends in the perpendicular direction with respect to the gate lines in the liquid crystal display panel and that the second electrode extends in the same direction as that of the gate lines in the liquid crystal display panel. The present invention can however be equally applied even in the opposite case where the first electrode extends in the same direction as that of the gate lines in the liquid crystal display panel and the second electrode extends in the perpendicular direction with respect to the gate lines in the liquid crystal display panel.

While it has also been described above that the liquid crystal display device is of the IPS scheme, the present invention can also be equally applied to liquid crystal display devices of other schemes. For use as a liquid crystal display device of a scheme other than IPS, the common electrode formed on the inner side of the counter substrate may be made to double as the second electrode for the touch panel.

What is claimed is:

1. A liquid crystal display device comprising a liquid crystal display panel having liquid crystals sandwiched between a first substrate and a second substrate, wherein:
   a first electrode is formed on an outer side of the first substrate to extend in a first direction, and a second electrode is formed on an inner side of the first substrate or second substrate to extend in a direction perpendicular to the first direction, where the inner side of the first substrate or second substrate represents a side of the first substrate or second substrate that faces the liquid crystals, and the outer side of the first substrate or second substrate represents a side opposite to the side of the first substrate or second substrate that faces the liquid crystals, the liquid crystal display panel thereby being endowed with a touch panel function;
   a protection film is formed over the first electrode;
   a polarization plate is disposed on the protection film via an adhesive material; and
   a rubbed surface exists as an interface of the protection film with respect to the adhesive material.

2. The liquid crystal display device according to claim 1, wherein the interface of the protection film with respect to the adhesive material ranges between 0.05 and 0.50 μm in surface roughness Rz.

3. The liquid crystal display device according to claim 1, wherein the interface of the protection film with respect to the adhesive material ranges between 0.05 and 0.20 μm in surface roughness Rz.

4. The liquid crystal display device according to claim 1, wherein the first electrode is formed from a metal or an alloy.

5. A method for manufacturing a liquid crystal display device with a liquid crystal display panel which includes liquid crystals sandwiched between a first substrate and a second substrate and which also functions as a touch panel, the manufacturing method comprising the steps of:
   forming a first electrode on an outer side of the first substrate so that the first electrode extends in a first direction, where the outer side of the first substrate represents a side opposite to the side of the first substrate that faces the liquid crystals;
   forming a protection film over the first electrode by means of inkjet coating;
   inspecting a defect in the protection film and then correcting the defect by inkjet coating;
   curing the protection film;

after the curing of the protection film, rubbing a surface of the cured protection film to a rough surface finish; and attaching a polarization plate to the surface of the protection film via an adhesive material.

6. The method for manufacturing a liquid crystal display device according to claim 5, wherein the rough surface formed on the surface of the protection film ranges between 0.05 and 0.50 µm in surface roughness Rz.

7. The method for manufacturing a liquid crystal display device according to claim 5, wherein the rough surface formed on the surface of the protection film ranges between 0.05 and 0.20 µm in surface roughness Rz.

8. A manufacturing method for a liquid crystal display device with a liquid crystal display panel which includes liquid crystals sandwiched between a first substrate and a second substrate and which also functions as a touch panel, the manufacturing method comprising the steps of:

forming a first electrode on an outer side of the first substrate so that the first electrode extends in a first direction, where the outer side of the first substrate represents a side opposite to the side of the first substrate that faces the liquid crystals;

forming a first protection film over the first electrode by means of inkjet coating;

forming a second protection film over the first electrode by means of inkjet coating;

curing the first protection film and the second protection film;

after the curing of the first protection film and the second protection film, rubbing a surface of the second protection film to a rough surface finish; and attaching a polarization plate to the surface of the second protection film via an adhesive material.

9. The method for manufacturing a liquid crystal display device according to claim 8, wherein the rough surface formed on the surface of the second protection film ranges between 0.05 and 0.50 µm in surface roughness Rz.

10. The method for manufacturing a liquid crystal display device according to claim 8, wherein the rough surface formed on the surface of the second protection film ranges between 0.05 and 0.20 µm in surface roughness Rz.

* * * * *